United States Patent [19]

Brotz

[11] Patent Number: 5,024,466
[45] Date of Patent: Jun. 18, 1991

[54] WEAR-PREVENTION STRUCTURE FOR PNEUMATIC CONVEYING PIPE ELBOW

[76] Inventor: Gregory R. Brotz, P.O. Box 1322, Sheboygan, Wis. 53081

[21] Appl. No.: 512,462

[22] Filed: Apr. 23, 1990

[51] Int. Cl.$^5$ .............................................. F16L 55/00
[52] U.S. Cl. ...................................... 285/16; 285/179; 406/193
[58] Field of Search ................... 285/15, 16, 179, 127, 285/17; 406/193

[56] References Cited

U.S. PATENT DOCUMENTS

| | | | |
|---|---|---|---|
| 3,977,730 | 8/1976 | Seick | 285/16 X |
| 4,387,914 | 6/1983 | Paulson et al. | 285/127 X |
| 4,595,319 | 6/1986 | Cook | 285/179 X |
| 4,606,556 | 8/1986 | Metzger | 285/179 X |
| 4,641,864 | 2/1987 | Heine | 285/179 |
| 4,865,353 | 9/1989 | Osborne | 285/16 |

*Primary Examiner*—Dave W. Arola
*Attorney, Agent, or Firm*—William Nitkin

[57] ABSTRACT

A structure to replace the outer wall of a pipe elbow to provide wear resistance in pneumatic conveying pipes carrying particulate material, said structure having a chamber with a source of vacuum suction therein disposed on the outer portion of the elbow with a screen disposed in the chamber where particles passing through the pipe are drawn and held by the suction against the screen member to form a particle accumulation area which is struck and worn by the oncoming stream of particles. Worn areas of the particle accumulation are replaced by new particles passing through the pipe.

1 Claim, 1 Drawing Sheet

WEAR-PREVENTION STRUCTURE FOR PNEUMATIC CONVEYING PIPE ELBOW

BACKGROUND OF THE INVENTION

1. Field of the Invention

The field of this invention resides in the area of pneumatic pipes for transporting particulate material used in various industrial processes and more particularly relates to a structure for preventing frictional wear by such particulate material striking the right-angle elbows of such pipes.

2. Description of the Prior Art

In many industrial processes particulate matter is transported through vacuum pipelines from one location to another, such pipes frequently incorporating right-angle bends or elbows. Often the particulate material is hard in nature and the inside of the outer portion of the right-angle bend or elbow is struck by such particles with strong impact as the particles make the right-angle turn through the pipe, causing such right-angle elbows in such pipes to wear through. Such abrasion requires frequent replacement of the worn elbow which replacement entails the shutting down of the processing line. Various durable materials have been used in the construction of such elbows to try to minimize wear, but such wear remains an unsolved problem in industrial production.

SUMMARY OF THE INVENTION

It is an object of this invention to provide a wear-resistant pipe elbow structure for use in conveying pipe systems such as used in industrial production. Often particulate materials passes from a fluidizer and is moved by vacuum suction along the conveying pipes, to, for example, a cyclone hopper and the like. The particulate material tends to wear the inside of the outer bend of an angled elbow such as a right-angle elbow or elbows of other angles in the pneumatic conveying pipes.

The structure of this invention provides a vacuum chamber at the outer portion of the elbow with a curved screen member therein, such screen having openings smaller than the individual particles of material being conveyed through the pipes. The screen is set back from the position where an elbow's outer wall would normally be positioned to allow for an accumulation of particulate material thereagainst without obstructing the flow of particulate material through the pipeline. The vacuum chamber has a vacuum source provided at the rear of the curved screen adapted to pull particles against the screen member where they accumulate, forming a surface on which the oncoming particles will impinge as they make the right angle turn. The outer surface of the particulate accumulation, if worn away by the abrasion of oncoming particulate material, is replaced by other oncoming particles attracted and held against the screen by suction from the rear of the vacuum chamber. Any air removed from the pipe by the vacuum source in the chamber is small as the interstices between the particles is small and labyrinthic and only a small suction is needed to hold the attracted particles.

Use of the structure of this invention significantly reduces wear to a right-angle elbow of a pneumatic pipeline. Further the screen can be easily and quickly replaced should it need replacement during use.

DESCRIPTION OF THE PREFERRED EMBODIMENT(S)

Figure 1:
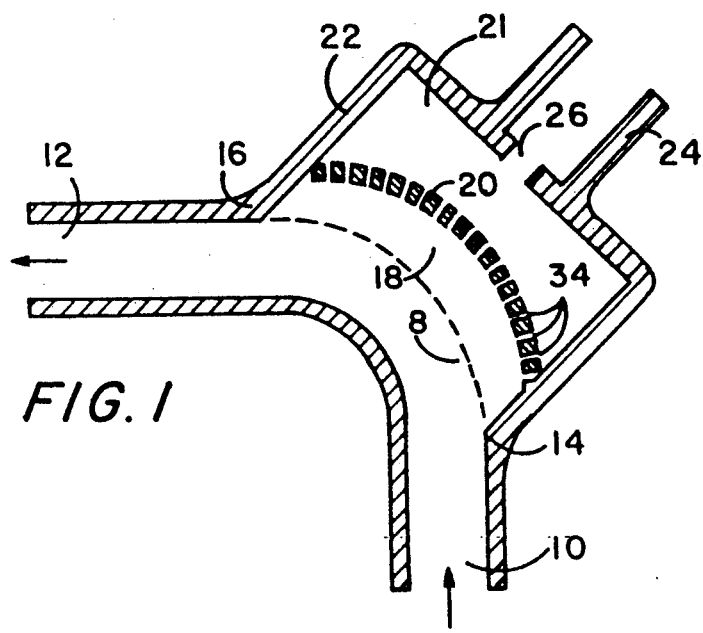
FIG. 1 illustrates a cross-sectional view through a right-angle elbow of a pneumatic pipeline showing the structure of this invention installed on the outer portion of the pipe's right-angle bend.
Figure 2:
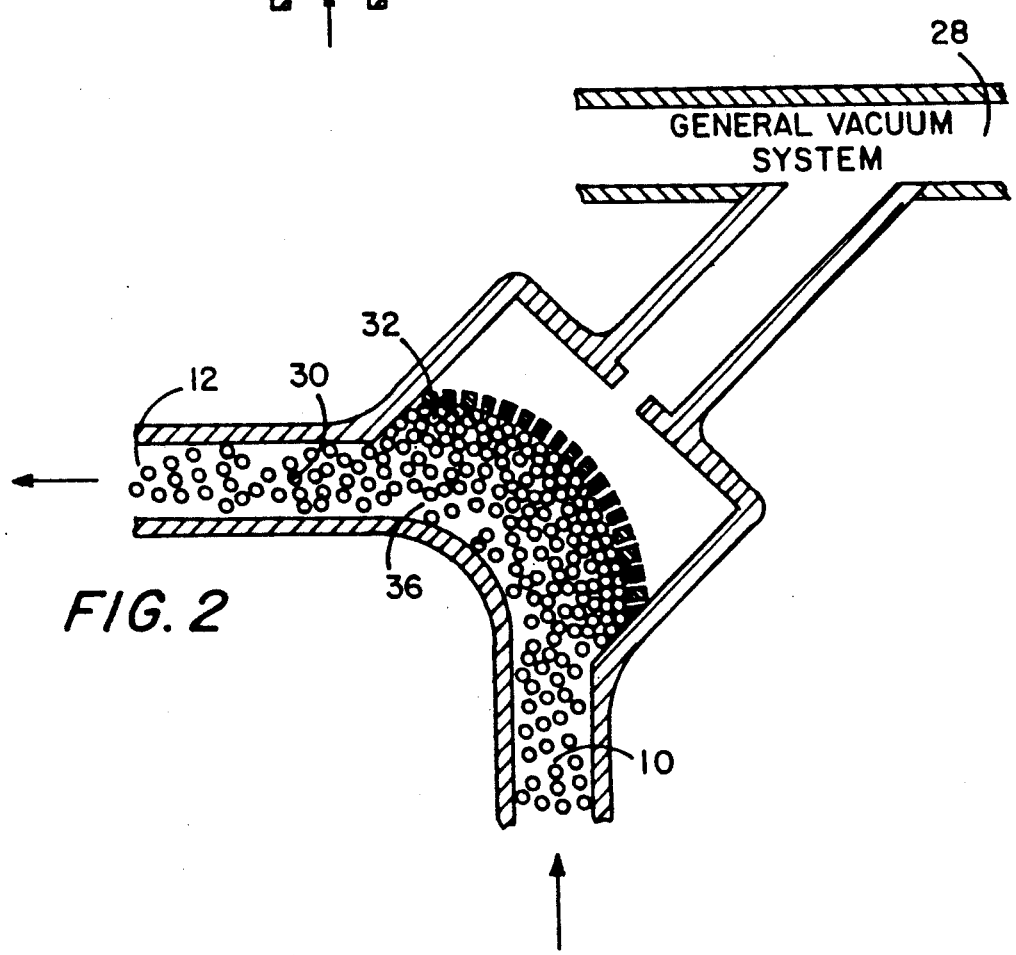
FIG. 2 illustrates the structure of FIG. 1 in use showing the accumulation of particulate materials against the screen member with particles flowing through the pipe in their normal course of travel.

FIG. 1 illustrates the structure of this invention positioned on a right-angle elbow of a particulate-conveying pipeline. Seen is typical conveying pipe 10 from a particle source such as a fluidizer. Connecting pipe 10 to pipe 12 is the right-angle elbow structure 22 of this invention. Pipe 12 can transport particulate material to a cyclone hopper or other structure used in industrial processes. Structure 22 of this invention includes chamber 21 which extends rearward from dotted line 8 which dotted line denotes the position of the standard outer wall of a right-angle elbow which is removed in this invention. Chamber 21 has disposed therein curved screen 20 with a plurality of openings 34 defined in screen 20. Area 18 in front of screen 20 occupies the space between screen 20 and where the outer wall of a traditional prior-art elbow would be positioned as denoted by line 8. At the rear of chamber 22 an interconnection through pipe 24 is made to vacuum line 28, as seen in FIG. 2, which provides suction to area 18 in chamber 22. As illustrated in FIG. 2, when particulate material passes through pipe 10, the suction from vacuum line 28 pulls some of the particulate material against screen 20. Since the particles are larger than openings 34 in screen 20, they do not pass through screen 20 and some particles build up against screen 20, forming an accumulation of particles 32. The particles thus drawn to screen 20 build up substantially to the position of dotted line 8 where the outer wall of a prior art pipe elbow would be located and allow, as seen in FIG. 2, particles 30 to continue to pass by as well as impinge upon the accumulation of particles 32 and then to continue along pipe 12 disposed at a right angle to pipe 10. In this way the particles passing through pipe 10 impinge upon the accumulated particles and not directly upon screen 20. Particles worn away from the mass of accumulated particles are quickly replaced by new particles drawn to screen 20 by suction from vacuum line 28 and held by suction against the accumulation of particles 32.

Should screen 20 need replacing, for example, to install a screen of different size mesh or for whatever reason, chamber 20 can be opened and a new screen easily and quickly installed. The continuous replacement and accumulation of particles 32 and wear characteristics of the particles striking against other particles of like hardness significantly lessens the frequency that the structure of this invention must be replaced in pneumatic conveying systems.

Although the present invention has been described with reference to particular embodiments, it will be apparent to those skilled in the art that variations and modifications can be substituted therefor without departing from the principles and spirit of the invention.

I claim:

1. A structure for installation at the junction of two pipes at angles to one another such as are joined by an elbow having an inner wall and an outer wall, such pipes usable for pneumatically conveying particulate material, comprising:

a chamber disposed substantially along and replacing the outer wall of said elbow structure;

a curved screen member having a plurality of openings therethrough smaller than the particulate material conveyed through said structure disposed in said chamber positioned away from where the outer wall of said elbow would be disposed;

an accumulation area defined between said screen member and the former position of said outer wall of said elbow; and suction means disposed to the rear of said screen member to apply suction through said screen member, said suction means of sufficient strength to pull some of said particulate material against said screen member to form a particulate material accumulation in said accumulation area, said particulate accumulation forming a wear surface in place of the outer wall of said elbow, such particle accumulation being worn by particles passing through said pipes impinging on said wear surface, with worn portions of said particle accumulation being replaced by other particulate material sucked against said particle accumulation.

* * * * *